Feb. 6, 1945.   J. B. CLARK   2,369,020

MIST SEPARATOR

Filed May 23, 1942

Inventor:
Joseph B. Clark
By Paul F. Hawley
Patent Agent

Patented Feb. 6, 1945

2,369,020

UNITED STATES PATENT OFFICE 2,369,020

MIST SEPARATOR

Joseph B. Clark, Tulsa, Okla., assignor to Stanolind Oil and Gas Company, Tulsa, Okla., a corporation of Delaware Application May 23, 1942, Serial No. 444,200

3 Claims. (Cl. 183—1)

This invention pertains to the art of separating finely divided liquid droplets from a gas stream in which they are suspended. The invention finds particular application in removal of fine suspended droplets or mist of hydrocarbon liquid from a gas.

In the problem of separating liquids from gases under atmospheric pressure, it is not difficult to separate out by scrubbing, centrifugal force or other means, the large size droplets of the liquid present. However, as the droplets become increasingly minute the buoyancy of the drops increases, i. e., the weight of the drop (which tends to make it drop out of the gas) decreases more rapidly than the buoyancy force exerted on the drop, which is proportional to the surface area of the droplet, since the buoyancy depends upon the number of gas molecules that strike the droplet per unit time. Accordingly, fine droplets tend to form a stable mist which is not separable from the gas by any of the usual expedients. The problem of separating these droplets becomes more difficult as the pressure on the gas is increased, because the density of the gas relative to that of the liquid increases under this condition so that there is a decrease in the force tending to separate out the droplets. Accordingly, it is an extremely difficult undertaking to separate out the droplets in a gas under superatmospheric pressure, particularly when this pressure exceeds around 200 to 400 pounds per square inch.

Attempts have been made to separate out the liquid in the mist form in the gas by subjecting the gas to recurrent pressure waves, for example by subjecting the mist to a standing wave of pressure variation of the amplitude of a few pounds per square inch at a frequency of several hundred cycles. It is found that the agitation thus produced tends to cause the droplets to strike together and agglomerate, forming drops of larger size. However, the matter of supplying the great amount of energy to cause this process to operate on a full scale has proved too difficult to accomplish prior to my invention.

I have found that it is possible to overcome the difficulty inherent in the prior art in separating out a liquid in the form of a mist from a gas at superatmospheric pressure by expanding at least a portion of the gas from an initial high pressure to a lower pressure while causing the gas to liberate the pressure energy in the form of high frequency pressure waves which act on the mist, by means of which the droplets of the mist are agglomerated into large particles which can be readily separated from the gas stream. In other words, the pressure energy of the gas is utilized to agglomerate the droplets. This process is of especial utilization in the separating out of hydrocarbon liquids from gases at a pressure of several hundred pounds per square inch, for example from 500 pounds per square inch to 3000 pounds per square inch or higher. In this pressure range it has been found exceedingly difficult in the past to prevent carry-over of the liquid in mist form into the gas stream so that a very appreciable amount of the desirable liquid hydrocarbons could not be recovered. It is to be realized that in the pressure range involved the density of the gas is quite high so that the mist has very little chance to drop out.

It is an object of this invention to provide an apparatus for separating droplets of liquid from a gas stream under superatmospheric pressure by the utilization of the pressure energy of said gas to agglomerate the droplets. It is a further object of this invention to cause the separation of droplets of hydrocarbon liquid in mist form from a stream of high pressure gas carrying this mist by expanding at least a portion of the high pressure gas to a lower pressure whereby some of the pressure energy of the gas is liberated and utilizing this energy to generate high frequency pressure waves in the gas stream by means of which the mist coalesces to larger droplets which are readily separated from the high pressure gas stream. Other objects of this invention will be apparent from the specification.

Certain embodiments of this invention are illustrated in simplified form in the attached drawing which form a part of the specification and which should be read in conjunction therewith. These figures are merely for the purpose of illustration and there is no intent to limit the invention to these particular embodiments. In these figures the same reference numeral in different drawing refers to the same or corresponding parts.

Figure 1:
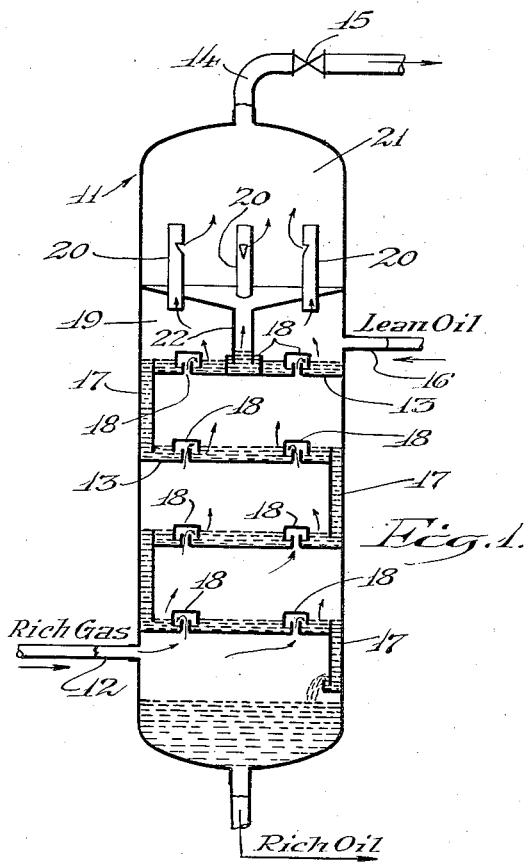
Figure 1 represents a cross section in diagrammatic form of an absorption tower used for separating liquids from gas under superatmospheric pressure, illustrating one use of my invention.

Referring now to Figure 1, a gas carrying recoverable liquids, for example a well stream from a distillate type well at a high pressure, for example within the retrograde condensation range of the desirable liquefiable constituents enters an absorption tower 11 through the intake pipe 12. If desired the stream may have been stripped of liquids before introduction into the absorber by any conventional means known in the art. This rich gas passes up through the bubble caps 18 of the trays 13 and is conducted away from the absorber through line 14. The pressure on this line may be maintained at any desired value by means of the valve 15 in line 14. Absorption oil is conducted into the absorber through line 16. It passes down across the trays 13 countercurrent to the upflowing high pressure gas by means of downcomers 17, being exposed at each bubble cap 18 to the gas whereby it absorbs the desirable liquefiable constituents from the gas stream. During this process some of the absorber oil is mingled with the uprising gas as a very fine mist. Part of the liquefiable hydrocarbons are also carried upward in the gas stream in the form of mist. Accordingly, in the zone 19 above the top tray 13 the gas still carries mechanically some of the liquid which should be recovered and which without further treatment would be lost. Ordinary mist collectors will not remove this mist due to the fineness of the drops of liquid and to the relatively low difference in densities between the liquid and the gas phases. In my invention, at least part of the gas stream escapes from zone 19 through tubes 20 which are designed in the form of high frequency pressure wave generators, for example whistles. The zone 21 above these whistles is at a lower pressure than in zone 19. Therefore at least part of the gas rushes through these whistles and produces high pressure periodic fluctuations in the zone 21 which may be either in the sonic range or in the supersonic range, preferably from about 5000 cycles per second to the order of 50,000 cycles per second or higher. The balance of the gas in zone 19 escapes into zone 21 through upriser 22 so that this gas is likewise exposed to the high frequency pressure waves in zone 21. The fine droplets of liquid are thus highly agitated and strike together, forming larger drops which are urged downward by gravity and which flow down through the upriser 22 onto the top tray 13. The denuded gas escapes through line 14. The portion of the high pressure gas which escapes through the whistles 20 and the difference in pressure of zones 19 and 21 governs the amount of energy which is transferred from the gas to the zone in the form of high frequency pressure fluctuations. This portion is found to vary depending upon the pressure and temperature of the gas and the amount of mist present. It should be noted that since the gas initially is at a pressure of around several hundred pounds per square inch at least, there is a tremendous source of energy here available for use in agglomerating the mist. It would be entirely impractical to supply the amount of energy necessary to accomplish the agglomeration by attempting to use external sources of energy for this purpose.

Figure 2:
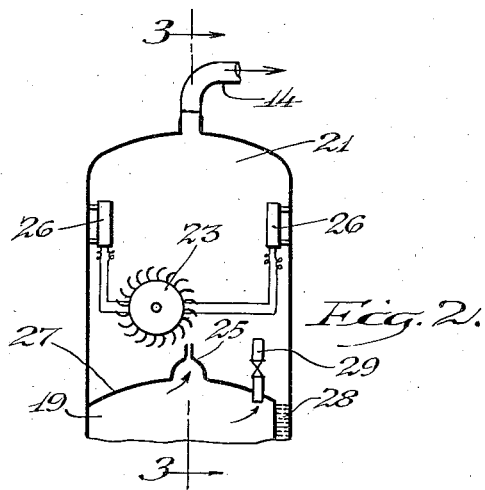
Figure 2 is a cross section in diagrammatic form of a portion of an absorber, showing a second embodiment of this invention.
Figure 3:
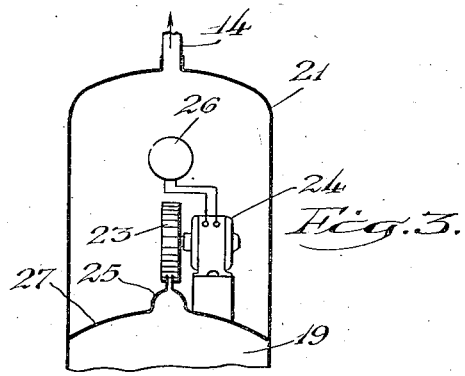
Figure 3 is a cross section across the line 3—3 of Figure 2.

It is apparent that the utilization of the pressure energy of the gas to excite high frequency pressure waves necessary to cause the agglomeration to take place may be in any one of a number of forms. For example, in Figures 2 and 3 which show a cross section of the top portion of a separator or absorption tower similar to Figure 1, the pressure energy of the expanding gas from which all but the liquid in the form of mist has been extracted, is utilized to rotate a small high speed turbine wheel 23 which is attached to a high frequency electric generator 24 mounted above the nozzle 25. The generator 24 is electrically connected to one or more high frequency acoustical radiators 26 which are preferably mounted near the side walls of the zone 21 so that the entire volume of this zone is exposed to the high frequency waves. The agglomerated liquid drops down on to the top surface of the conical plate 27 from which it flows through the downcomer 28 onto the top plate of the tower. In some cases it may be found that more gas is available than that needed to drive the turbine wheel 23. In such cases I provide a valved line 29 extending through the conical plate 27 through which the excess of the gas beyond that needed to rotate the turbine 23 can escape from zone 19 to zone 21.

Figure 4:
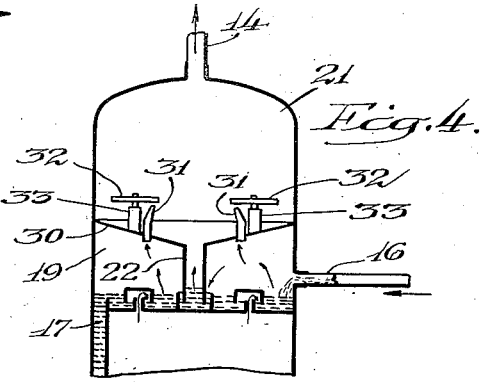
Figure 4 is a cross section of a part of a high pressure liquid gas separator utilizing another form of this invention.

In Figure 4 another type of pressure wave generator is shown placed in the top of an absorption tower similar to that described in connection with Figure 1. In this case a concave plate 30 is mounted in the top of zone 19 connected to the upriser 22. A portion of the high pressure gas in zone 19 escapes into the top zone 21 through nozzles 31 which are directly obliquely against the face of siren plates 32 rotatably mounted on bases 33 attached to the plate 30. The gas expanded through the nozzles 31 rotates the siren plates 32 at a high speed and simultaneously passes through the holes of these plates, generating the high frequency pressure waves in the zone 21. The remainder of the gas in zone 19 passes into the zone 21 through upriser 22. The mist in this zone 21 is subjected to the high frequency pressure waves emitted by the sirens and is agglomerated, falling out of the high pressure gas and passing down through the upriser 22 onto the top plate 13.

Figure 5:
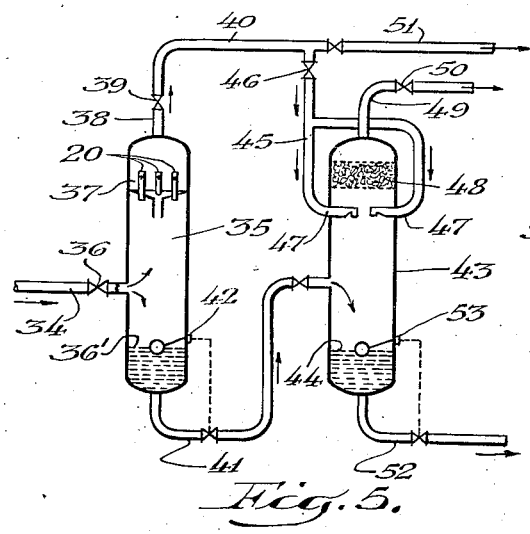
Figure 5 is a cross section of a part of a recovery system for hydrocarbon liquids from a high pressure gas stream utilizing stage separation and involving a further form of my invention.

In Figure 5 is an application of the invention is shown in which a portion of the high pressure gas is expanded to generate the high frequency pressure waves, not in the same vessel, but in a lower pressure vessel. In this figure gas under superatmospheric pressure entering line 34 passes into a first separator 35. This incoming gas may be, for example, at 1500 pounds per square inch and may be expanded through valve 36 to a pressure of 1000 pounds per square inch. Due to the phenomenon of retrograde condensation, a large part of the liquefiable constituents of the high pressure gas becomes liquid at this decreased pressure and drop to the bottom of separator 35 forming interface 36' with the gas. Some of the liquid in the form of mist passes upward with the expanded high pressure gas and may be recovered by a mist separator 37 in the top of separator 35 which is similar to that shown in the top of the absorber in Figure 1 including a set of whistles 20. The high pressure gas largely denuded of its liquid constituents passes upward through line 38 past pressure maintenance valve 39 into line 40. The liquid in the separator 35 is removed through line 41 controlled by a liquid level control 42 and is expanded into a lower pressure separator 43 which may, for example, be operated at 300 pounds per square inch. At this lower pressure a large part of the volatile hydrocarbons present in liquid form in line 41 vaporize while the less volatile liquids drop down in separator 43 to form an interface 44 with the gas in this chamber. The uprising gas in the upper portion of the separator carries with it a considerable portion of previously recovered hydrocarbon liquids in the form of mist. High pressure gas from line 40 is admitted in the upper part of the separator 43 through a line 45 controlled by valve 46. The pressure energy in this gas is utilized to energize high frequency pressure wave generators, for example whistles 47 which are mounted in the upper part of chamber 43, so that the rising gas in the separator 43 is subjected to the high frequency waves necessary to agglomerate the rising mist. If desired, the section 48 of the separator 43 above the whistles can be packed with fibrous material such as excelsior, glass wool or the like. This serves to collect the liquid agglomerated by the high frequency pressure waves set up in the chamber and permits the liquid to drain back down to the bottom of the separator. The denuded gas passes off through line 49 controlled by valve 50 and may be utilized as fuel or the like. Since only a relatively small portion of the high pressure gas in line 40 is needed for agglomeration, the remainder passes on through line 51 which may go to a compressor for reinjection into a subsurface formation or for other purposes. The total liquid in separator 43 passes off through line 52 controlled by liquid level control valve 53 from which it may go to storage or to further treatment. It is thus seen that a part of the high pressure gas can thus be utilized to generate high pressure waves in a separate vessel for the agglomeration of the mist in that vessel. Of course, it is apparent that instead of these whistles any other device for utilizing the pressure energy of the gas to generate the high frequency pressure waves could have been used.

Further variations in this system will be apparent to those skilled in this art. The invention is not limited to the applications shown and described but is best set out in the appended claims.

I claim:

1. Apparatus for the extraction of liquids in the form of fine mist entrained in a hydrocarbon stream at a pressure of at least 500 pounds per square inch, said stream being predominantly composed of light gaseous hydrocarbons, which includes a closed vessel defining a mist extraction zone, an exit pipe for conducting relatively mist-free gases from said vessel, at least one gas-actuated generator of supersonic waves mounted in said vessel, said generator including a conduit passing through a wall of said vessel and forming means for the entry of at least part of said stream into said vessel, whereby gases passing through said generator produce supersonic wave energy causing said mist to be agglomerated into drops falling to the bottom of said vessel, a draw-off pipe for removing said liquid from said vessel, and means for accumulating a portion of said agglomerated liquid within said pipe to prevent flow of gas therethrough.

2. Apparatus for the extraction of liquids in the form of fine mist entrained in a hydrocarbon stream at a pressure of at least 500 pounds per square inch, said stream being predominantly composed of light gaseous hydrocarbons, which includes a closed vessel defining a mist extraction zone, an exit pipe for conducting relatively mist-free gases from said vessel, a plurality of gas-actuated high frequency whistles for producing high frequency pressure waves in the range from about 5000 cycles per second to about 50,000 cycles per second, said whistles being mounted in said vassel, each of said whistles including a conduit passing through a wall of said vessel and forming means for the entry of at least part of said stream into said vessel, whereby gases passing through each said whistle generates supersonic wave energy causing said mist to be agglomerated into drops falling to the bottom of said vessel, a draw-off pipe for removing said liquid from said vessel, and means for accumulating a portion of said agglomerated liquid within said pipe to prevent flow of gas therethrough.

3. Apparatus for the extraction of liquids in the form of fine mist entrained in a hydrocarbon stream at a pressure of at least 500 pounds per square inch, said stream being predominantly composed of light gaseous hydrocarbons, which includes a closed vessel defining a mist extraction zone, an exit pipe for conducting relatively mist-free gases from said vessel, a plurality of gas-actuated high frequency sirens for producing high frequency pressure waves in the range from about 5000 cycles per second to about 50,000 cycles per second, each of said sirens being mounted in said vessel, each of said sirens including a conduit passing through a wall of said vessel and forming means for the entry of at least part of said stream into said vessel, whereby gases passing through said sirens produce supersonic wave energy causing said mist to be agglomerated into drops falling to the bottom of said vessel, a draw-off pipe for removing said liquid from said vessel, and means for accumulating a portion of said agglomerated liquid within said pipe to prevent flow of gas therethrough.

JOSEPH B. CLARK.